US012598626B2

(12) United States Patent (10) Patent No.: US 12,598,626 B2
Hwang et al. (45) Date of Patent: Apr. 7, 2026

(54) METHOD AND APPARATUS FOR DETERMINING TRANSMIT POWER OF PSFCH IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 740 days.

(21) Appl. No.: 17/995,202

(22) PCT Filed: Feb. 22, 2021

(86) PCT No.: PCT/KR2021/002179
§ 371 (c)(1),
(2) Date: Sep. 30, 2022

(87) PCT Pub. No.: WO2021/201432
PCT Pub. Date: Oct. 7, 2021

(65) Prior Publication Data
US 2023/0146928 A1 May 11, 2023

(30) Foreign Application Priority Data

Mar. 30, 2020 (KR) ........................ 10-2020-0038420

(51) Int. Cl.
*H04W 72/25* (2023.01)
*H04B 17/318* (2015.01)
*H04W 52/36* (2009.01)
(52) U.S. Cl.
CPC .......... *H04W 72/25* (2023.01); *H04B 17/318* (2015.01); *H04W 52/367* (2013.01)

(58) Field of Classification Search
CPC ................................................ H04W 52/0209
See application file for complete search history.

(56) References Cited

U.S. PATENT DOCUMENTS

2014/0086293 A1* 3/2014 Koike .................. H04B 17/327
375/224
2019/0182859 A1* 6/2019 Khoryaev ............. H04W 52/42
(Continued)

OTHER PUBLICATIONS

PCT International Application No. PCT/KR2021/002179, International Search Report dated May 25, 2021, 4 page.
(Continued)

*Primary Examiner* — Pamit Kaur
(74) *Attorney, Agent, or Firm* — LEE, HONG, DEGERMAN, KANG & WAIMEY

(57) ABSTRACT

Proposed is an operation method for a first device (100) in a wireless communication system. The method may comprise the steps of: receiving, from a second device (200), first sidelink control information (SCI) via a physical sidelink control channel (PSCCH); receiving, from the second device (200), a reference signal and data via a physical sidelink shared channel (PSSCH) related to the PSCCH; determining a physical sidelink feedback channel (PSFCH) resource, on the basis of a subchannel and slot related to the PSSCH; measuring reference signal received power (RSRP), on the basis of the reference signal received via the PSSCH related to the PSFCH resource; determining first transmit power of a PSFCH transmitted on the PSFCH resource, on the basis of the RSRP; and transmitting, to the second device (200), the PSFCH on the basis of the determined first transmit power of the PSFCH.

9 Claims, 22 Drawing Sheets

(56) References Cited

U.S. PATENT DOCUMENTS

| | | | |
|---|---|---|---|
| 2019/0313300 A1* | 10/2019 | Yiu | H04W 74/0891 |
| 2020/0022089 A1 | 1/2020 | Guo | |
| 2020/0228247 A1* | 7/2020 | Guo | H04L 1/0025 |
| 2020/0260386 A1* | 8/2020 | Ryu | H04W 76/14 |
| 2020/0260472 A1* | 8/2020 | Ganesan | H04W 4/46 |

OTHER PUBLICATIONS

LG Electronics, "Feature lead summary#2 for AI 7.2.4.5 Physical layer procedures for sidelink," R1-2001338, 3GPP TSG RAN WG1 #100, e-Meeting, Mar. 2020, 55 pages.

Huawei et al., "Sidelink physical layer procedures for NR V2X," R1-1911887, 3GPP TSG RAN WG1 Meeting #99, Nov. 2019, 32 pages.

Catt, "Feature lead summary on AI 7.2.4.3 #2 Sidelink synchronization mechanism," R1-2000833, 3GPP TSG RAN WG1 #100, e-Meeting, Mar. 2020, 28 pages.

Panasonic, "Remaining issue on physical layer procedures for sidelink in NR V2X," R1-2000993, 3GPP TSG RAN WG1 #100, e-Meeting, Mar. 2020, 8 pages.

* cited by examiner

FIG. 1

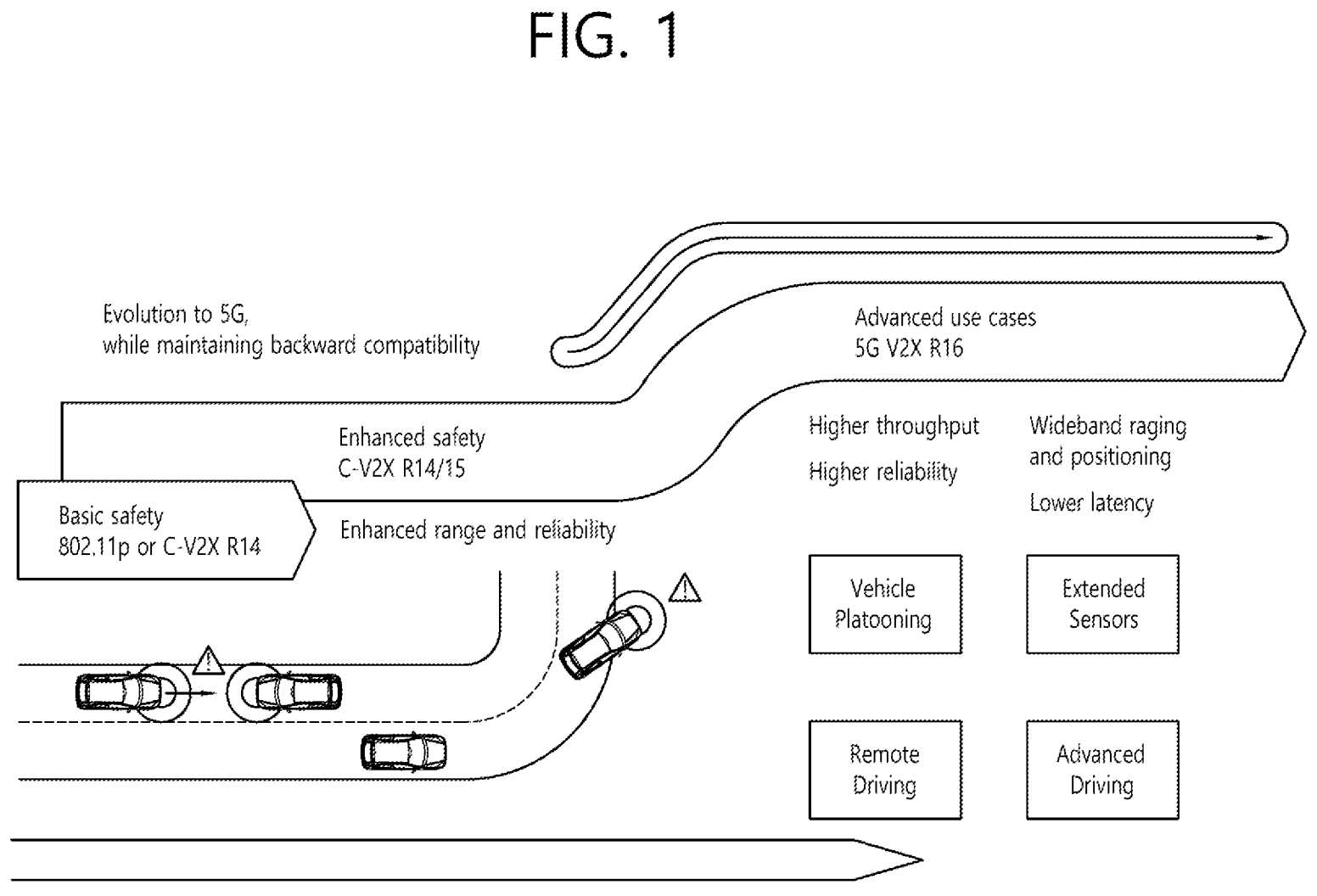

Evolution to 5G, while maintaining backward compatibility

Basic safety
802.11p or C-V2X R14

Enhanced safety
C-V2X R14/15

Enhanced range and reliability

Advanced use cases
5G V2X R16

Higher throughput
Higher reliability

Wideband raging and positioning
Lower latency

Vehicle Platooning

Extended Sensors

Remote Driving

Advanced Driving

FIG. 4
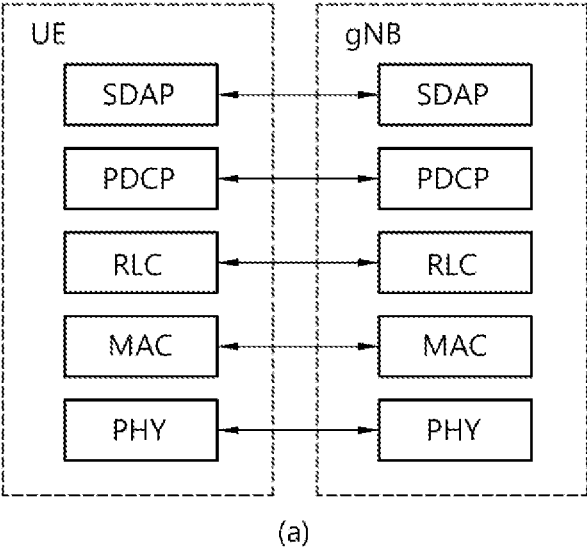
(a)
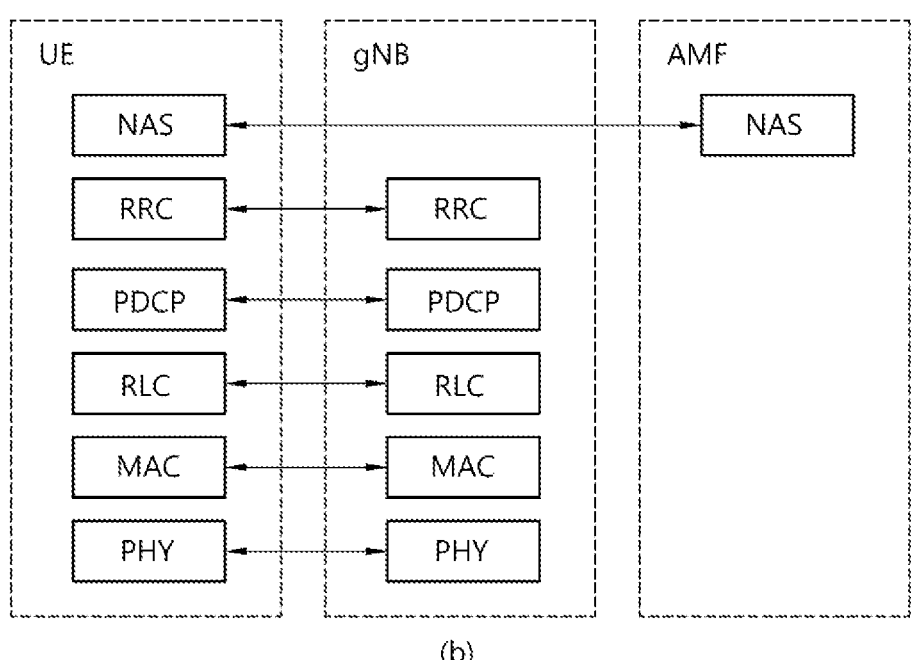
(b)

FIG. 7

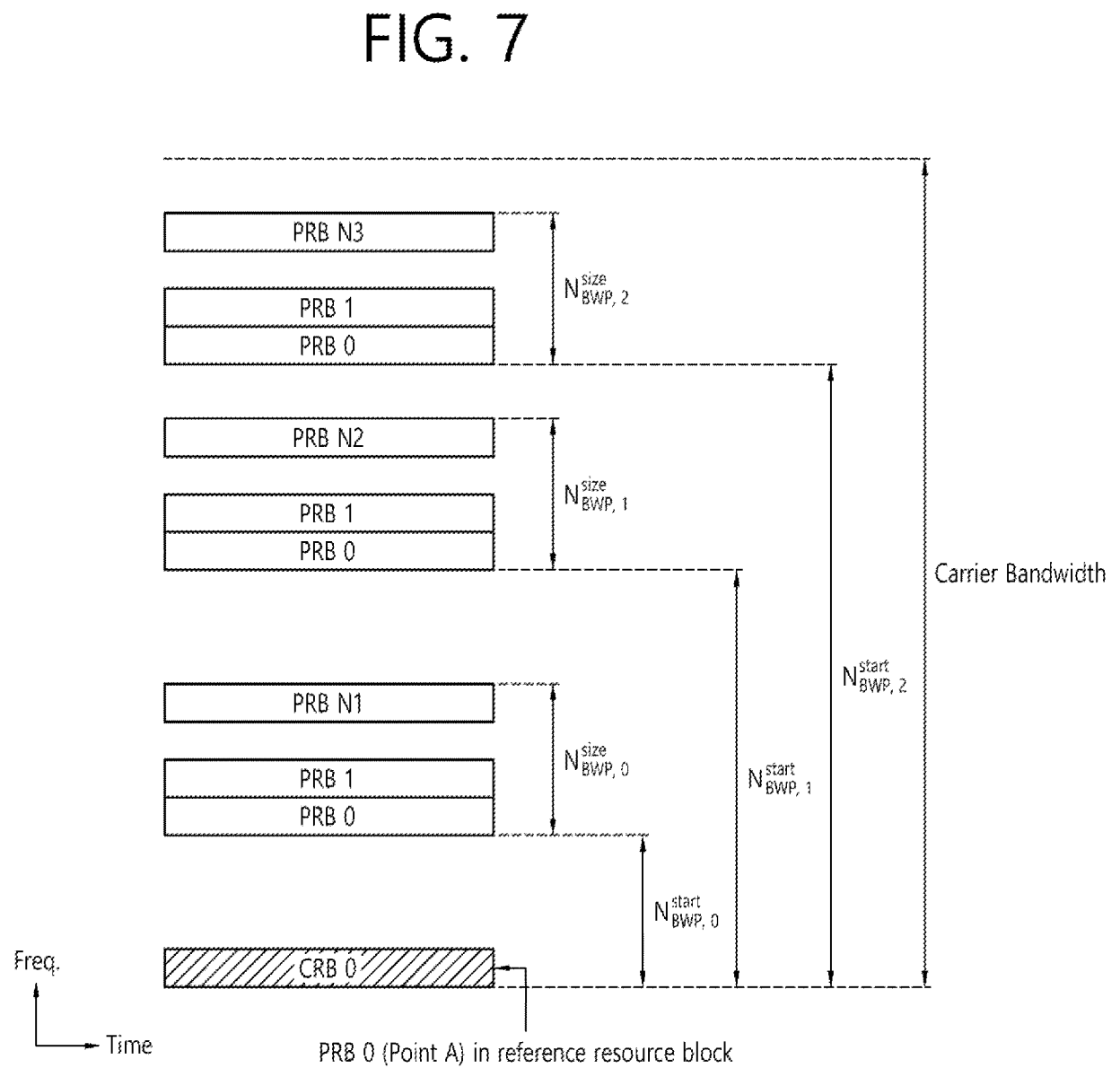

Carrier Bandwidth $N_{BWP, 2}^{start}$ $N_{BWP, 1}^{start}$ $N_{BWP, 0}^{start}$ $N_{BWP, 2}^{size}$ $N_{BWP, 1}^{size}$ $N_{BWP, 0}^{size}$

PRB N3

PRB 1

PRB 0

PRB N2

PRB 1

PRB 0

PRB N1

PRB 1

PRB 0

CRB 0

PRB 0 (Point A) in reference resource block

Time

Freq.

FIG. 8
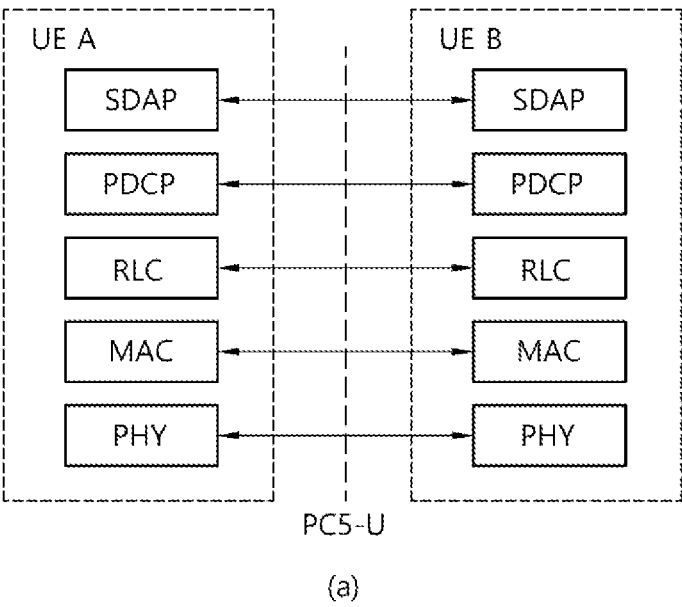
PC5-U
(a)
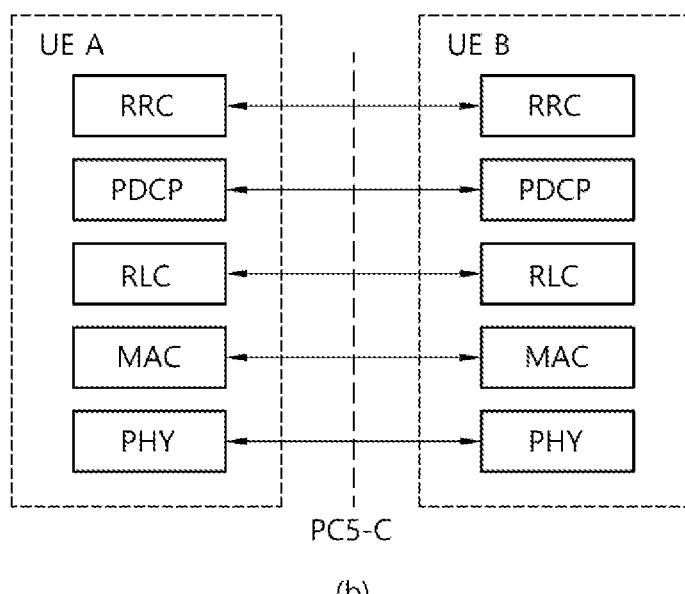
PC5-C
(b)

FIG. 9
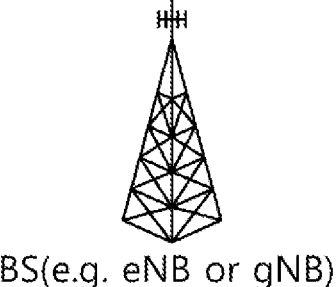
BS(e.g. eNB or gNB)
UE 1                                        UE 2

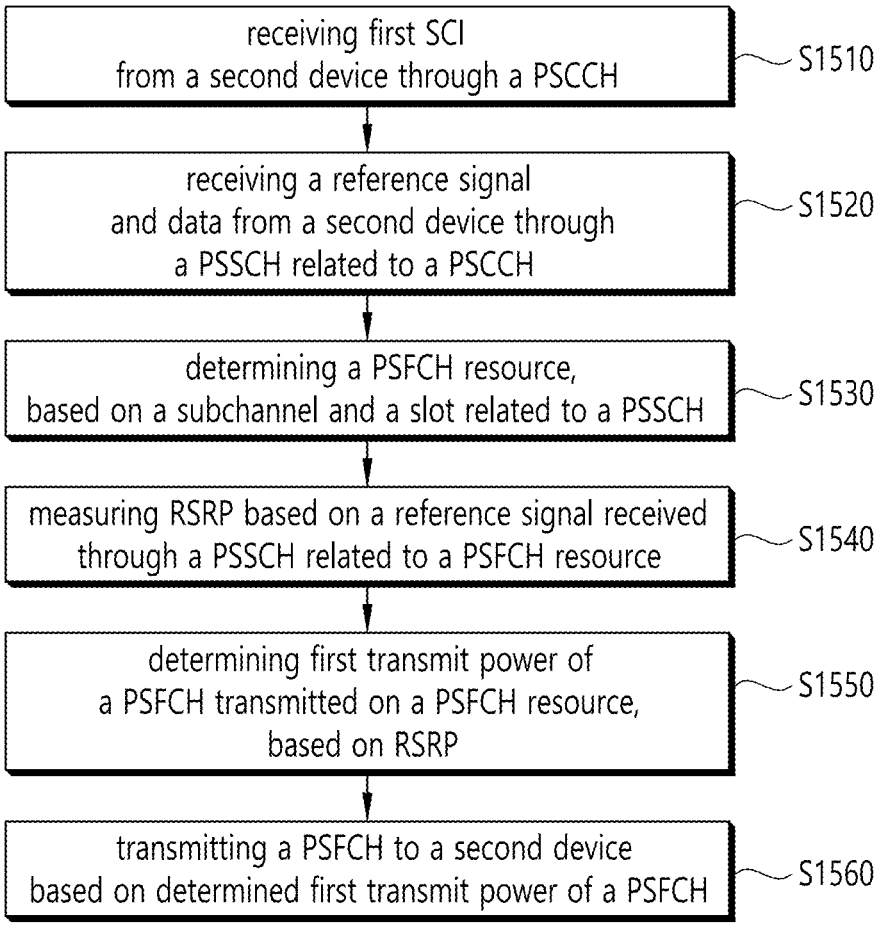

receiving first SCI
from a second device through a PSCCH — S1510 receiving a reference signal
and data from a second device through
a PSSCH related to a PSCCH — S1520 determining a PSFCH resource,
based on a subchannel and a slot related to a PSSCH — S1530 measuring RSRP based on a reference signal received
through a PSSCH related to a PSFCH resource — S1540 determining first transmit power of
a PSFCH transmitted on a PSFCH resource,
based on RSRP — S1550 transmitting a PSFCH to a second device
based on determined first transmit power of a PSFCH — S1560 transmitting first SCI to a first device through a PSCCH ~ S1610 transmitting a reference signal and data
to a first device through a PSSCH related to a PSCCH ~ S1620 receiving a PSFCH from a first device
based on first transmit power ~ S1630

Figure 22:
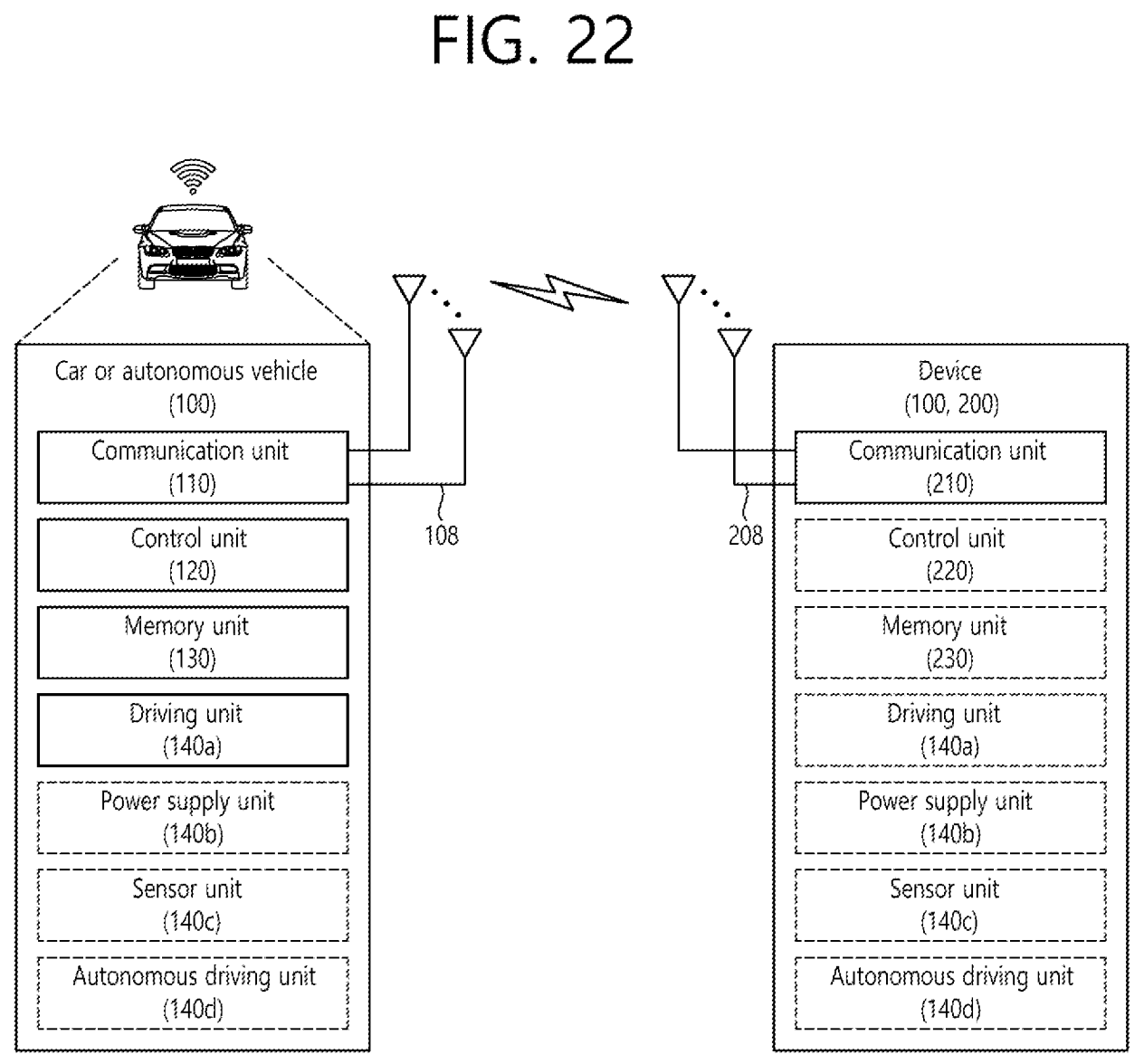

Car or autonomous vehicle (100)

- Communication unit (110)
- Control unit (120)
- Memory unit (130)
- Driving unit (140a)
- Power supply unit (140b)
- Sensor unit (140c)
- Autonomous driving unit (140d)

108

Device (100, 200)

- Communication unit (210)
- Control unit (220)
- Memory unit (230)
- Driving unit (140a)
- Power supply unit (140b)
- Sensor unit (140c)
- Autonomous driving unit (140d)

208

METHOD AND APPARATUS FOR DETERMINING TRANSMIT POWER OF PSFCH IN NR V2X

CROSS-REFERENCE TO RELATED APPLICATION(S)

This application is the National Stage filing under 35 U.S.C. 371 of International Application No. PCT/KR2021/002179, filed on Feb. 22, 2021, which claims the benefit of earlier filing date and right of priority to Korean Application No. 10-2020-0038420, filed on Mar. 30, 2020, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first device 100 in a wireless communication system is proposed. The method may comprise: receiving first sidelink control information (SCI) from a second device 200 through a physical sidelink control channel (PSCCH); receiving a reference signal and data from the second device 200 through a physical sidelink shared channel (PSSCH) related to the PSCCH; determining a physical sidelink feedback channel (PSFCH) resource, based on a subchannel and a slot related to the PSSCH; measuring reference signal received power (RSRP) based on the reference signal received through the PSSCH related to the PSFCH resource; determining first transmit power of a PSFCH transmitted on the PSFCH resource, based on the RSRP; and transmitting the PSFCH to the second device 200 based on the determined first transmit power of the PSFCH.

Effects of the Disclosure

The user equipment (UE) may efficiently perform SL communication.

BRIEF DESCRIPTION OF THE DRAWINGS

FIG. 1 is a drawing for describing V2X communication based on NR, compared to V2X communication based on RAT used before NR.

FIG. 4 shows a radio protocol architecture, in accordance with an embodiment of the present disclosure.

FIG. 7 shows an example of a BWP, in accordance with an embodiment of the present disclosure.

FIG. 8 shows a radio protocol architecture for a SL communication, in accordance with an embodiment of the present disclosure.

FIG. 9 shows a UE performing V2X or SL communication, in accordance with an embodiment of the present disclosure.

FIG. 15 shows a method for a first device to perform wireless communication, according to an embodiment of the present disclosure.

FIG. 17 shows a communication system 1, in accordance with an embodiment of the present disclosure.

FIG. 22 shows a car or an autonomous vehicle, in accordance with an embodiment of the present disclosure.

DESCRIPTION OF EXEMPLARY EMBODIMENTS

Figure 2:
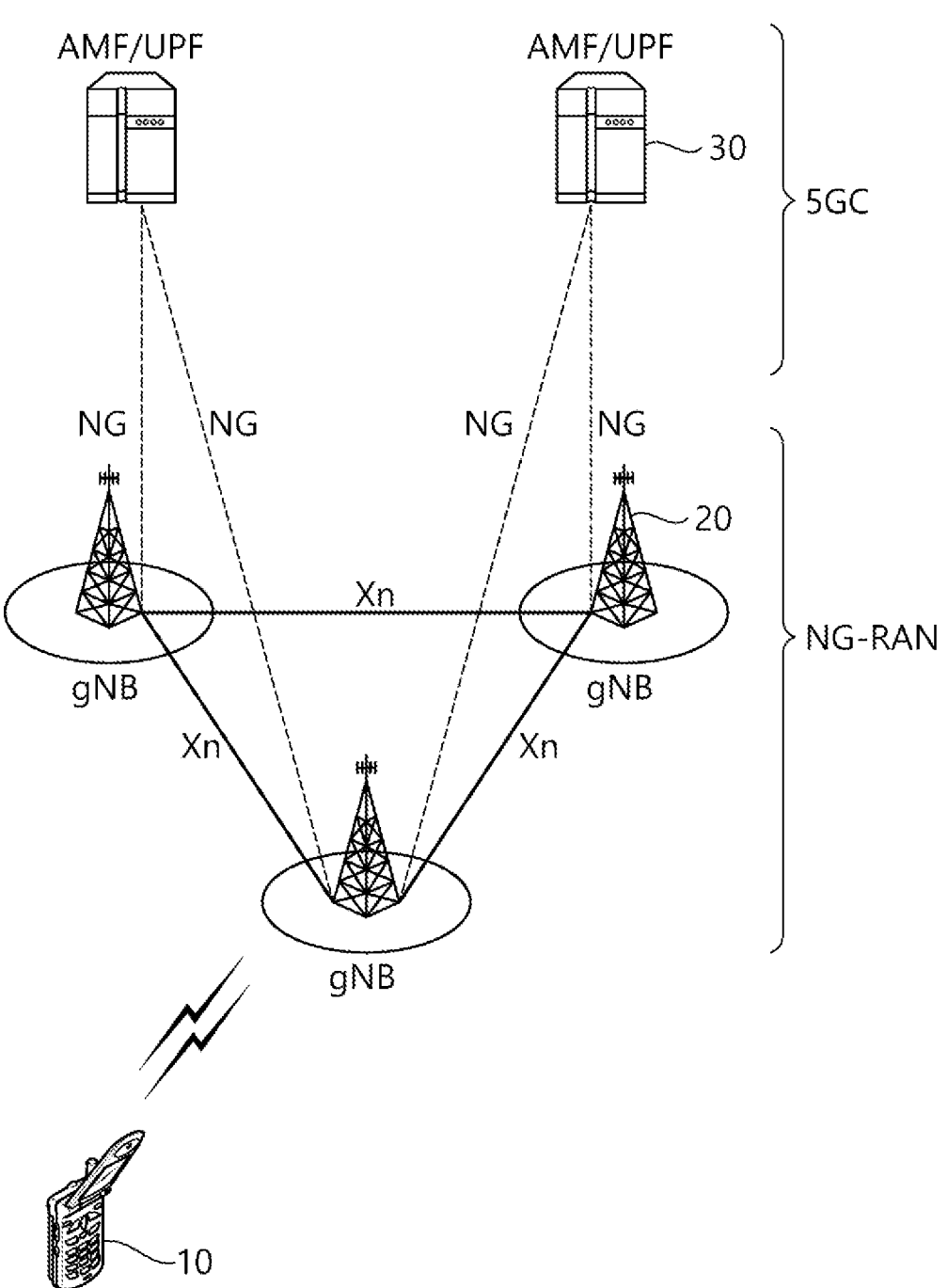
FIG. 2 shows a structure of an NR system, in accordance with an embodiment of the present disclosure.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
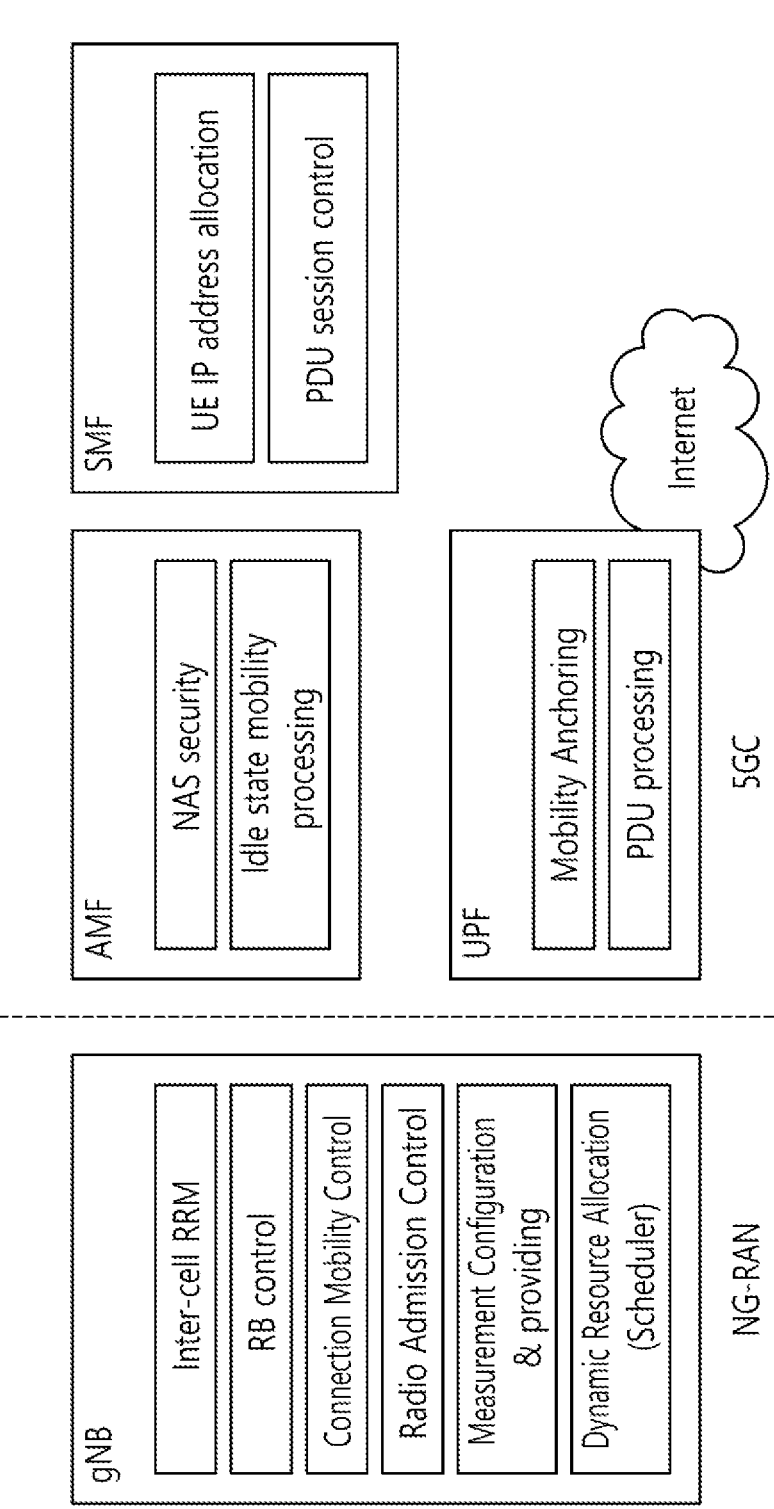
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b)

shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
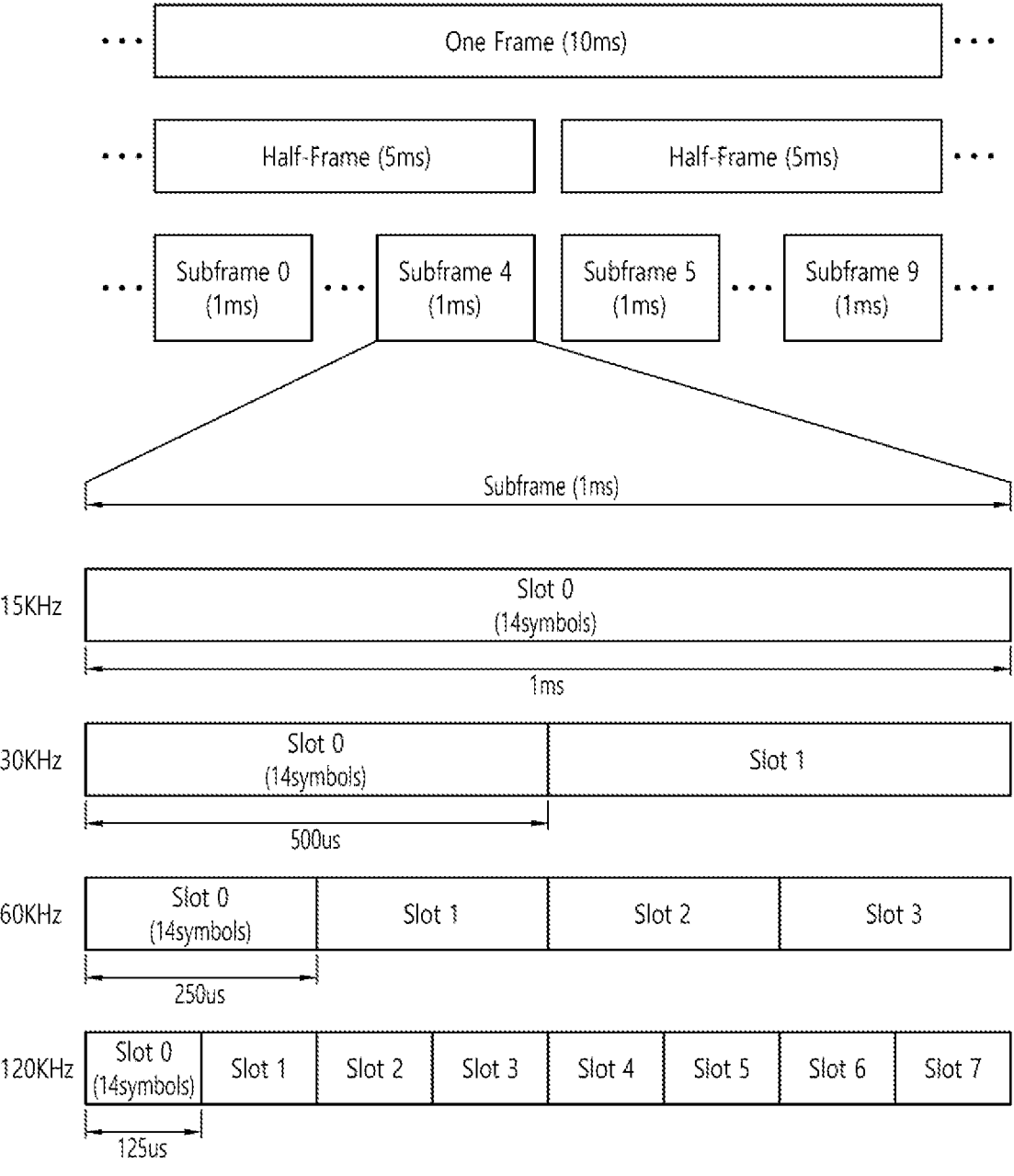
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
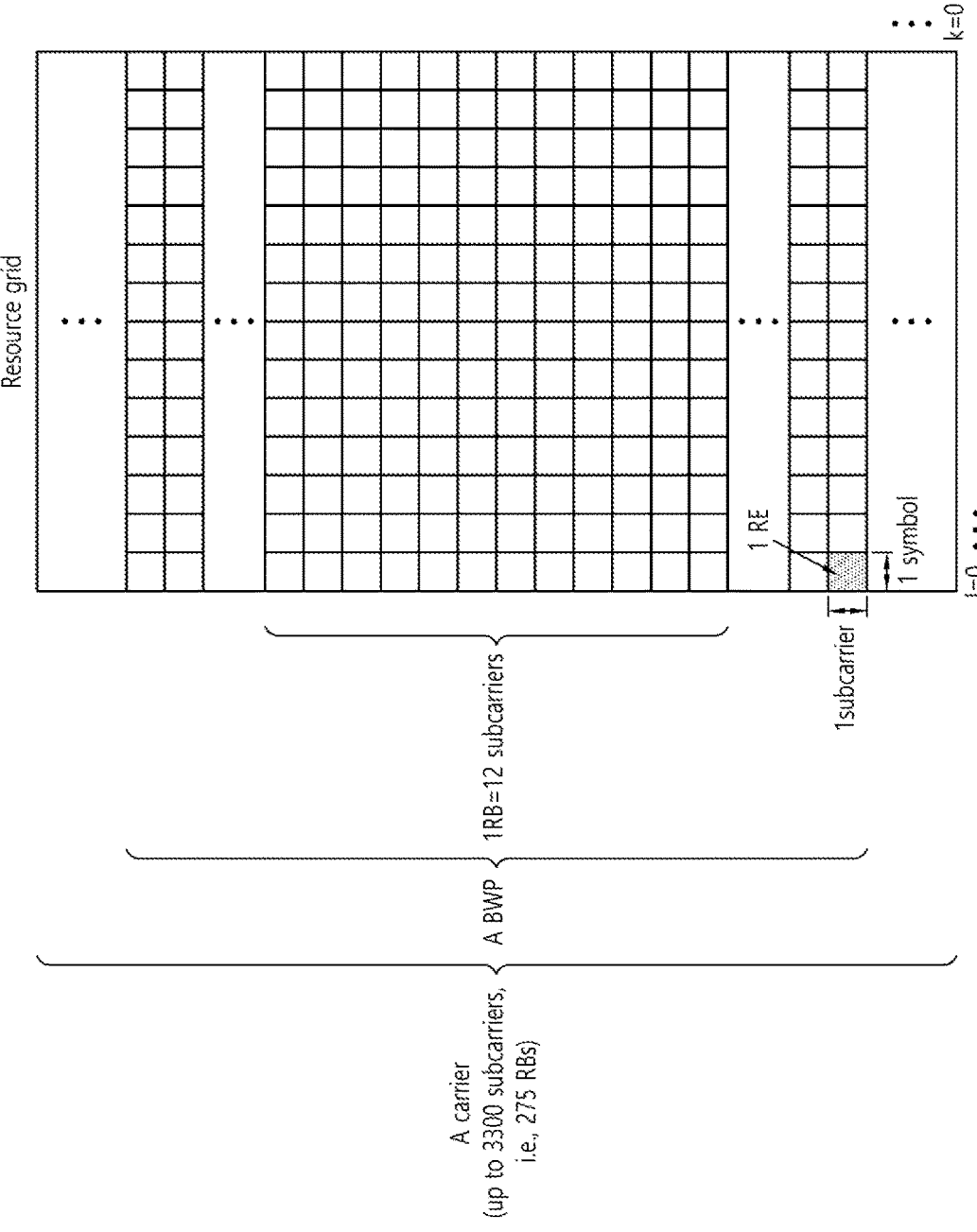
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/ PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)config- ured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 9 shows a UE performing V2X or SL communica- tion, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first device 100, and a UE 2 may be a second device 200.

For example, the UE 1 may select a resource unit corre- sponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
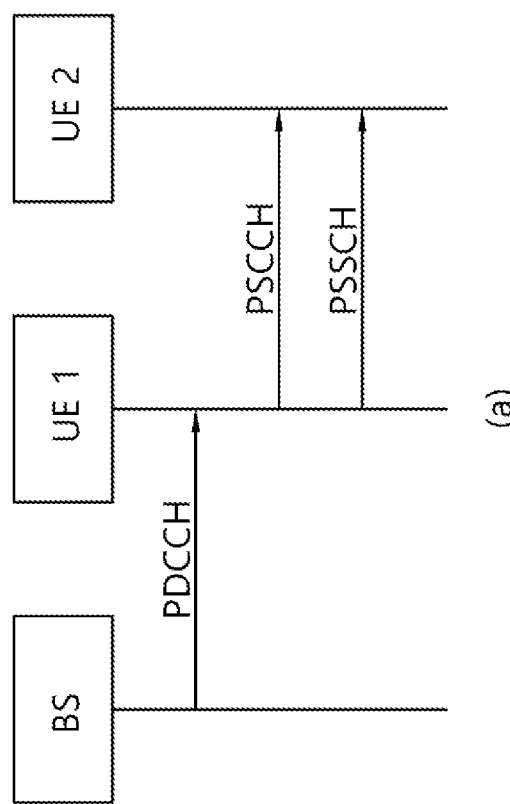
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodi- ments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
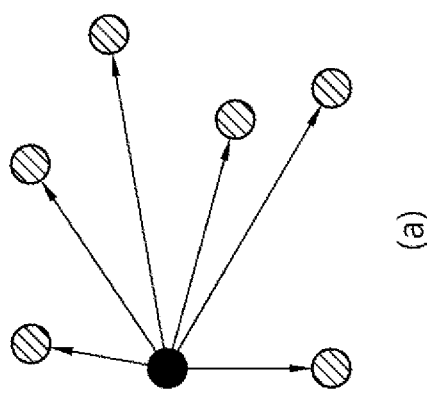
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast- type SL communication, FIG. 11(b) shows unicast type-SL communication, and FIG. 11(c) shows groupcast-type SL communication. In case of the unicast-type SL communica- tion, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present dis- closure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. And/or, for example, the TX UE may be a UE which transmits SL channel state information reference signal(s) (CSI-RS(s)) and/or a SL CSI report request indication to (target) RX UE(s). For example, the TX UE may be a UE which transmits a (control) channel (e.g., PSCCH, PSSCH, etc.) and/or reference signal(s) through the (control) channel, which is/are used for SL radio link monitoring (RLM) operation(s) and/or SL radio link failure (RLF) operation(s)

of (target) RX UE(s). For example, the reference signal may include demodulation reference signal(s) (DM-RS(s)) and/or CSI-RS(s), etc.

Meanwhile, in various embodiments of the present disclosure, a receiving UE (i.e., RX UE) may be a UE which transmits SL hybrid automatic repeat request (HARQ) feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, when a receiving UE transmits SL HARQ feedback information for a PSSCH and/or a PSCCH received from a transmitting UE, the following method may be considered or partly considered. Here, for example, the corresponding scheme or some schemes may be limitedly applied only when a receiving UE successfully decodes/detects a PSCCH for scheduling a PSSCH.

(1) Groupcast HARQ feedback Option 1: transmit negative acknowledgement (NACK) information to a TX UE, only when an RX UE fails to decode/receive a PSSCH received from the TX UE.

(2) Groupcast HARQ feedback Option 2: transmit acknowledgement (ACK) information to a TX UE when an RX UE succeeds to decode/receive a PSSCH, or if it fails to decode/receive a PSSCH, transmit NACK information to a TX UE.

Meanwhile, in various embodiments of the present disclosure, for example, a TX UE may transmit at least one of the following information to an RX UE through SCI. Here, for example, a TX UE may transmit at least one of the following information to an RX UE through first SCI (FIRST SCI or Pt-stage SCI) and/or second SCI (SECOND SCI or $2^{nd}$-stage SCI).

PSSCH (and/or PSCCH) related resource allocation information (e.g., location/number of time/frequency resources, resource reservation information (e.g., period))

SL CSI report request indicator or SL (L1) RSRP (and/or SL (L1) RSRQ and/or SL (L1) RSSI) report request indicator (on PSSCH) SL CSI transmission indicator (or SL (L1) RSRP (and/or SL (L1) RSRQ and/or SL (L1) RSSI) information transmission indicator)

Modulation and Coding Scheme (MCS) information transmit power information

L1 destination ID information and/or L1 source ID information

SL HARQ process ID information new data indicator (NDI) information redundancy version (RV) information (transmission traffic/packet related) QoS information (e.g., priority information)

SL CSI-RS transmission indicator or the number of (transmitted) SL CSI-RS antenna ports information location information of TX UE or location (or distance region) information of a target RX UE (where SL HARQ feedback is required)

information on decoding of data transmitted through PSSCH and/or a reference signal (e.g., DM-RS, etc.) related to channel estimation. For example, the information on a reference signal may be information related to the pattern of the (time-frequency) mapping resource of a DM-RS, RANK information, antenna port index information, antenna port number information, etc.

Meanwhile, in various embodiments of the present disclosure, for example, since a TX UE can transmit SCI, first SCI and/or second SCI to an RX UE through PSCCH, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa, since a transmitting UE may transmit second SCI to a receiving UE through PSSCH.

Meanwhile, in various embodiments of the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "definition" may mean (resource pool specific) (pre-)configuration (through predefined signaling (e.g., SIB, MAC, RRC, etc.)) from a base station or a network.

Meanwhile, in the present disclosure, for example, since "RLF" may be interpreted as mutually extended to at least one of out of synch (OOS) and in synch (IS), "RLF" may be replaced/substituted with OOS of IS.

Meanwhile, in various embodiments of the present disclosure, for example, a resource block (RB) (or PRB) may be replaced/substituted with a subcarrier, or vice versa. For example, a packet or a traffic may be replaced/substituted with a transport block (TB) or a medium access control protocol data unit (MAC PDU) according to a transmission layer, or vice versa.

For example, a code block group (CBG) may be replaced/substituted with a TB, or vice versa.

For example, a source ID may be replaced/substituted with a destination ID, or vice versa.

For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a sub-selection window may be replaced/substituted with a selection window and/or a pre-configured number of resource sets within the selection window, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be replaced/substituted with a configured grant (CG) and/or an SPS grant. For example, a dynamic grant (DG) may be replaced/substituted with a combination of a configured grant (CG) and a semi persistent scheduling (SPS) grant. Or, for example, a configured grant (CG) may be substituted/replaced with type 1 configured grant or type 2 configured grant.

Meanwhile, in various embodiments of the present disclosure, for example, a channel may be replaced/substituted with a signal.

Meanwhile, in various embodiments of the present disclosure, for example, a cast type may be replaced/substituted with unicast, group cast, and/or broadcast.

On the other hand, in various embodiments of the present disclosure, for example, a resource may be interchanged/replaced with a slot or a symbol.

Meanwhile, in various embodiments of the present disclosure, blind retransmission may mean an operation in which a TX UE performs retransmission without receiving SL HARQ feedback information from an RX UE. Also, for example, a retransmission based on SL HARQ feedback may mean an operation in which a TX UE determines whether to perform retransmission based on SL HARQ feedback information received from an RX UE, and performs retransmission. Specifically, for example, when a TX UE performs SL HARQ feedback-based retransmission, when the TX UE receives NACK and/or DTX from an RX UE, retransmission may be performed to the RX UE.

Meanwhile, in various embodiments of the present disclosure, time may be replaced/substituted with frequency from the viewpoint of resources. For example, a time resource may be replaced/substituted with a frequency resource.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

The sleep state of a UE may include at least one of a deep sleep state, a light sleep state, and/or a micro sleep state. For example, in a deep sleep state, a UE operates in the lowest power consumption mode, a baseband circuitry maintains timing at the lowest accuracy level, other baseband activity is minimized, and an RF circuitry may not be active. For example, in a light sleep state, a UE can start reception with a fairly small delay by maintaining timing using a clock and activity level. For example, in the micro-sleep state, a UE uses relatively high power consumption compared to the light sleep state, but the UE may turn ON/OFF an active period (Active Time, that is, a time period for performing PSCCH and/or PSSCH and/or sidelink signal detection attempts) without delay or with negligible delay, and the timing may be maintained. For example, in the light sleep state, a UE may turn ON/OFF the activation period in units of slots or in units of ms. For example, in the micro-sleep state, a UE may turn ON/OFF the activation period in units of symbols. For example, in the light sleep state, the sum of the time period for a UE to enter the activation period and the time period for leaving the activation period may be 6 ms, and there may be additional energy consumption. For example, in the micro sleep state, there may be no delay according to ON/OFF of the activation period and no additional energy consumption.

Meanwhile, in a next-generation communication system, depending on a cast type, a UE may efficiently control the power of the UE based on a pathloss between UEs. For example, in the case of unicast, according to the configuration of a resource pool, a UE can control transmit power value for the PSCCH/PSSCH by using a pathloss between UEs, here, the power value determined based on the pathloss between a base station and the UE may be configured as the upper limit. According to the above method, a receiving UE receiving a PSCCH/PSSCH may report a reference signal received power (RSRP) periodically or aperiodically to a transmitting UE transmitting the PSCCH/PSSCH, the transmitting UE may estimate the pathloss between the transmitting UE and the receiving UE based on the RSRP value reported by the receiving UE and the transmit power value for a reference signal (RS) used by the receiving UE for RSRP measurement. Here, for example, the RSRP value may be an L3 filtered RSRP value. For example, transmit power value for the RS may be at least one of a transmit power value for each RS, an average value of transmit power values for the RS, and/or a filter-based output value.

Figure 12:
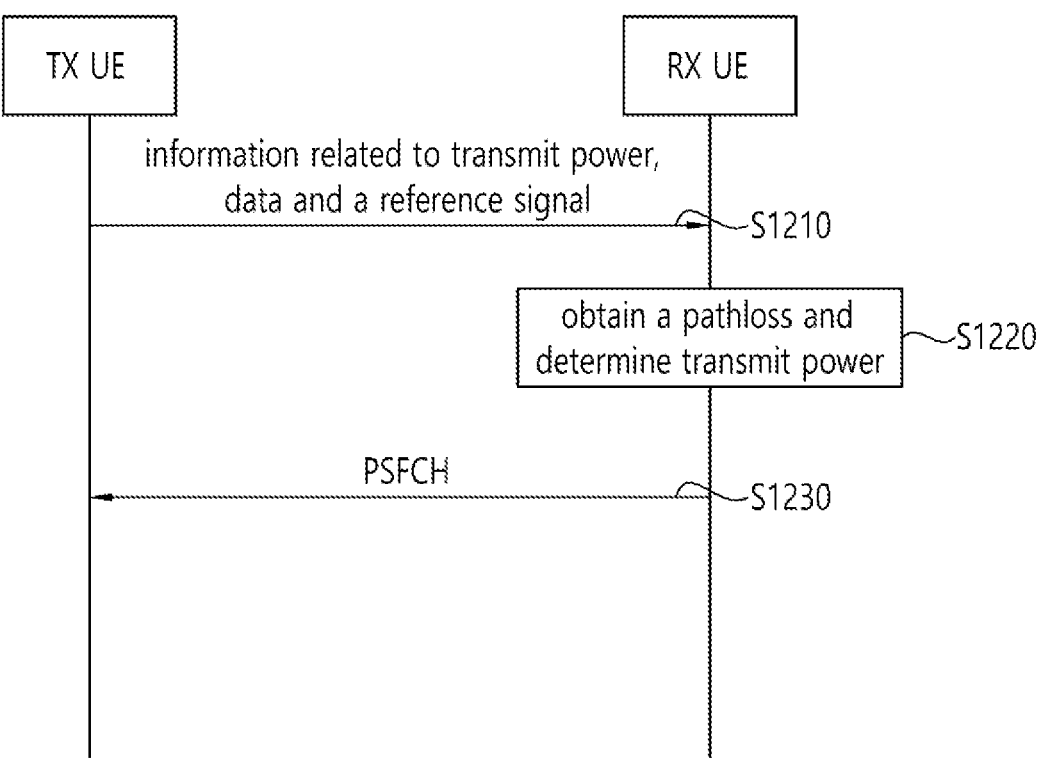
FIG. 12 shows a procedure for a receiving UE to transmit a PSFCH according to an embodiment of the present disclosure.

FIG. 12 shows a procedure for a receiving UE to transmit a PSFCH according to an embodiment of the present disclosure. The embodiment of FIG. 12 may be combined with various embodiments of the present disclosure.

Referring to FIG. 12, in step S1210, a transmitting UE may transmit a reference signal, data, and information related to transmit power of a reference signal to a receiving UE. In step S1220, the receiving UE may obtain RSRP related to the reference signal. And, for example, the receiving UE may obtain the pathloss related to the transmitting UE based on the RSRP and the transmit power of the reference signal. And, for example, the receiving UE may determine the transmit power of a PSFCH related to the data to be transmitted to the transmitting UE based on the pathloss. In step S1230, the receiving UE may transmit the PSFCH to the transmitting UE based on the transmit power of the PSFCH.

Figure 13:
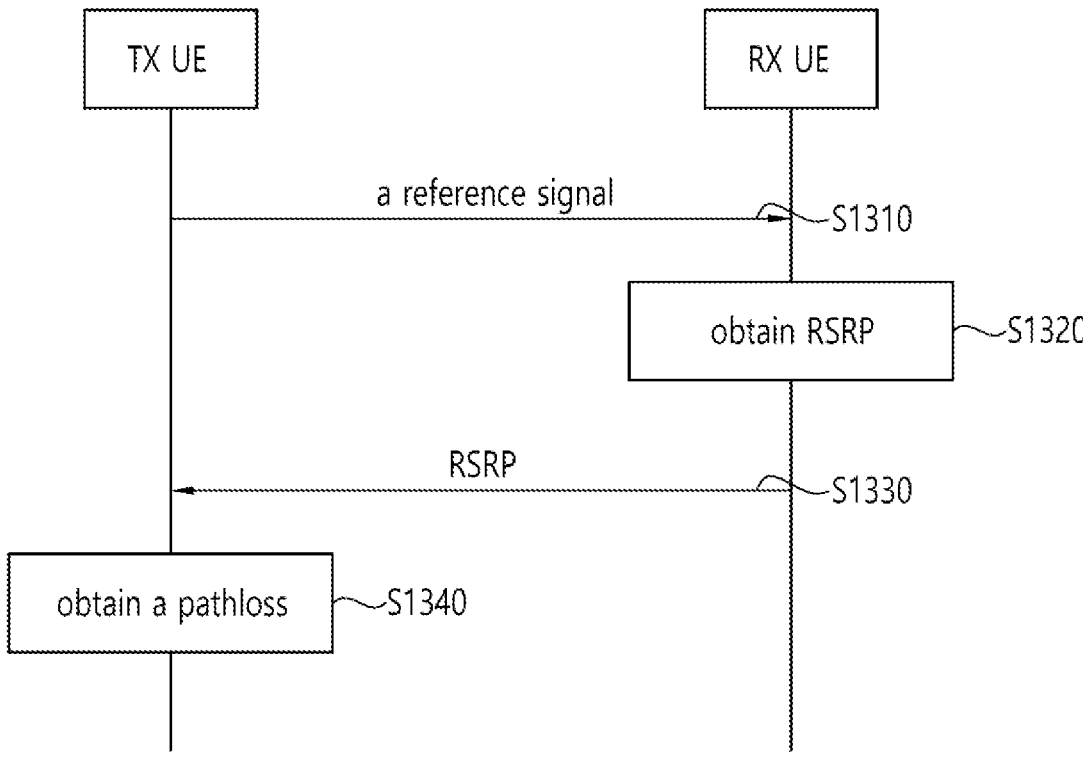
FIG. 13 shows a procedure for a transmitting UE to obtain a pathloss according to an embodiment of the present disclosure.

FIG. 13 shows a procedure for a transmitting UE to obtain a pathloss according to an embodiment of the present disclosure. The embodiment of FIG. 13 may be combined with various embodiments of the present disclosure.

Referring to FIG. 13, in step S1310, a transmitting UE may transmit a reference signal to a receiving UE. For example, the transmitting UE may store information related to the transmit power of the reference signal. In step S1320, the receiving UE may obtain RSRP related to the reference signal. In step S1330, the receiving UE may transmit information related to the RSRP to the transmitting UE. In step S1340, the transmitting UE may obtain the pathloss related to the receiving UE based on the RSRP and the transmit power of the reference signal. For example, based on the pathloss, the transmitting UE may perform communication with the receiving UE in the future.

For example, in the case of a PSFCH, since a receiving UE receiving a PSCCH/PSSCH is the principal transmitting the PSFCH, the process of the receiving UE estimating the inter-UE pathloss may be inefficient or not possible. Accordingly, in this case, the receiving UE may perform power control on the PSFCH, based on the pathloss between a base station and the receiving UE. In addition, in the case of groupcast and/or broadcast, it may not be efficient or possible for a transmitting UE to transmit a PSCCH/PSSCH to receive an RSRP report from each receiving UE. Accordingly, in this case, the transmitting UE may perform power control on the PSCCH/PSSCH, based on the pathloss between a base station and the transmitting UE.

For example, in the above power control method, a UE may not use a pathloss between a base station and the UE and/or a pathloss between UEs. Here, when a pathloss value between a base station and a UE is greater than a pathloss value between UEs performing actual sidelink transmission and reception, or when a UE does not use information related to a pathloss for power control, there may still be room for transmit power to be wasted inefficiently.

According to various embodiments of the present disclosure, a method for efficiently configuring transmit power of a sidelink channel by a UE and a device supporting the same when a UE cannot use information related to pathloss between UEs, or when a UE does not use information related to pathloss between UEs are proposed. In addition, in order to achieve the above object, information used by a UE to configure transmit power, a method for using the information by a UE, and a device supporting the same are proposed.

For example, a UE may determine or configure the maximum transmit power that can be used to transmit a PSFCH (hereinafter, the maximum transmit power for a PSFCH). For example, the maximum transmit power for the PSFCH may be configured to be smaller than the maximum transmit power of a UE (hereinafter, PCmax). For example, the maximum transmit power for a PSFCH may be limited to a value obtained by multiplying PCmax by a scaling value. For example, PCmax may be a linear value. For example, PCmax may be a dB value. For example, the scaling value may be configured or pre-configured for the UE for each resource pool. For example, the scaling value may be configured or pre-configured for the UE for each type of UE. For example, the scaling value may be configured or pre-configured for the UE for each power saving mode. In the above case, when a plurality of PSFCH transmissions are allowed/supported, additionally, a UE may determine the maximum transmit power for a PSFCH based on the number of simultaneously transmitted PSFCHs or the maximum number of simultaneously transmittable PSFCHs. For example, a UE may apply the scaling value to a value obtained by dividing a linear value of PCmax by the number of transmitted PSFCHs. For example, a UE may apply the scaling value to a value obtained by dividing a linear value of PCmax by the maximum number of PSFCHs that can be transmitted simultaneously. For example, a separate parameter used by a UE to determine the maximum transmit power for a PSFCH may be configured or pre-configured for the UE. For example, a PCmax value may have a different value for each type of UE and/or for each power saving mode.

For example, the maximum number of PSFCHs capable of simultaneous transmission may be different for each type of UE and/or for each power saving mode. For example, the maximum number of PSFCHs capable of simultaneous transmission may be configured or pre-configured for a UE for each type of UE and/or for each power saving mode. For example, the maximum number of PSFCHs capable of simultaneous transmission may be defined as a part of UE capability. For example, depending on the type and/or power saving mode of a UE, the UE may transmit HARQ feedback information for a plurality of PSSCHs through a PSFCH. For example, a combination of a PSFCH resource and/or a cyclic shift value used by a UE for PSFCH transmission may be different according to HARQ feedback information. Here, PSFCH resource(s) available for a UE to transmit a PSFCH may be resource(s) related to a PSCCH/PSSCH corresponding to the HARQ feedback information. For example, the PSFCH resource may be at least one of a time resource, a frequency resource, and/or a code domain resource.

For example, PSFCH reception and/or PSFCH transmission of a UE may overlap at the same time point. In this case, even if the PSFCH transmission of the UE is selected with high priority, the UE may select the number of transmittable PSFCHs according to UE capability based on a priority value indicated by SCI. For example, the priority value indicated by the SCI may be an L1 priority value. For example, the SCI may be related to the PSFCH. For example, the SCI may schedule a PSSCH related to the PSFCH. In the above case, when the total transmit power of a UE performing a plurality of PSFCH transmission exceeds PCmax and/or when the total transmit power of the UE performing the plurality of PSFCH transmission exceeds the upper power limit for power saving, additionally, the UE may select a PSFCH to be omitted or to finally select a PSFCH to be transmitted. For example, the maximum number of PSFCHs that a UE can transmit simultaneously may be predefined for a power limited case and a power non-limited case, respectively. For example, the maximum number of PSFCHs that a UE can transmit simultaneously is configured or pre-configured for each UE, for a power limited case and a power non-limited case. For example, a UE may determine a priority for each PSFCH based on the HARQ feedback option corresponding to each PSFCH. For example, a UE may determine a priority for each PSFCH based on a cast type corresponding to each PSFCH. For example, a UE may determine a priority for each PSFCH based on an HARQ feedback value (e.g., ACK, NACK, or discontinuous transmission (DTX)) corresponding to each PSFCH. For example, a UE may determine a priority for each PSFCH based on the number of HARQ retransmissions corresponding to each PSFCH. For example, a UE may determine a priority for each PSFCH based on a residual Packet Delay Budget (PDB) corresponding to each PSFCH. For example, in the case of groupcast HARQ feedback option 1, a UE may transmit a PSFCH related to NACK without transmitting a PSFCH related to ACK. In this case, the NACK transmission may have a higher priority than other transmissions. For example, when a UE omits the NACK transmission, since a UE receiving the PSFCH may erroneously determine that the corresponding PSSCH is ACK, and thus the overall delay time may be increased, so the NACK transmission may have a higher priority than other transmissions. For example, in the case of unicast and groupcast HARQ feedback option 2, the priority of ACK transmission may be higher than that of NACK transmission. For example, since a UE receiving the PSFCH may determine that retransmission is necessary when receiving a NACK through a PSFCH or not receiving the PSFCH, the priority of ACK transmission may be higher than the priority of NACK transmission.

For example, the transmit power of a PSFCH may be indicated through SCI (e.g., $1^{st}$-stage SCI and/or $2^{nd}$-stage SCI) and/or PSSCH. For example, a transmitting UE transmitting a PSSCH/PSCCH may transmit information related to the transmit power of a PSFCH to a receiving UE through SCI and/or a PSSCH. For example, the information related to the transmit power of the PSFCH may be an offset value. For example, a transmitting UE may indicate to a receiving UE an offset value for adjusting the PSFCH transmit power on SCI. Here, for example, a receiving UE may increase the transmit power value of a PSFCH by using the offset value. For example, a receiving UE may reduce the transmit power value of a PSFCH by using the offset value. For example, a receiving UE may maintain the transmit power value of a PSFCH by using the offset value.

For example, the offset value may have a different set according to the number of simultaneously transmitted PSFCHs, or may be (pre)configured for a UE. For example, the offset value may have a different set for each maximum number of simultaneously transmittable PSFCHs, or may be (pre)configured for a UE. For example, the offset value may have a different set for each type of UE or may be (pre) configured for a UE. For example, the offset value may have a different set for each maximum number of simultaneously transmittable PSFCHs, or may be (pre)configured for a UE. For example, the offset value may have a different set for each number of simultaneously transmitted PSFCHs, or may be (pre)configured for a UE. For example, the offset value may have a different set for each power control mode, or may be (pre)configured for a UE. For example, the offset value may have a different set for each type of service, or may be (pre)configured for a UE. For example, the offset value may have a different set for each priority or may be (pre)configured for a UE.

For example, according to a power offset value indicated by each SCI received by a UE, the UE may differently configure or determine the transmit power of each PSFCH transmitted at the same time.

For example, a UE may configure or determine the transmit power of a PSFCH to be transmitted at the same time.

For example, a UE may configure or determine the transmit power of a plurality of PSFCHs by using a power offset value indicated by a specific SCI among a plurality of SCIs. For example, a UE may configure or determine the transmit power of a plurality of PSFCHs by using the largest power offset value among power offset values indicated by a plurality of SCIs related to the plurality of PSFCHs. For example, a UE may configure or determine the transmit power of a plurality of PSFCHs by using the smallest power offset value among power offset values indicated by a plurality of SCIs related to the plurality of PSFCHs. For example, a UE may configure or determine the transmit power of a plurality of PSFCHs by using the average power offset value of power offset values indicated by a plurality of SCIs related to the plurality of PSFCHs. For example, a UE may configure or determine the transmit power of a plurality of PSFCHs by using a power offset value indicated by the earliest SCI among a plurality of SCIs related to the plurality of PSFCHs. The PSFCHs corresponding to the plurality of SCIs may be transmitted/received within the same slot. For example, a UE may configure or determine the transmit power of a plurality of PSFCHs by using a power offset value indicated by the latest SCI among a plurality of SCIs related to the plurality of PSFCHs. For example, a UE may configure or determine the transmit power of a plurality of PSFCHs by using a power offset value indicated by SCI having the highest priority among a plurality of SCIs related to the plurality of PSFCHs. Here, for example, a UE may determine SCI having the highest priority based on an L1 priority value indicated by a plurality of SCIs.

For example, the transmit power of a PSFCH may be changed based on the distance between a transmitting UE and a receiving UE or information corresponding thereto. For example, in the case of groupcast HARQ feedback option 1, a transmitting UE may transmit location information (e.g., Zone ID) for the transmitting UE to a receiving UE through SCI (e.g., $2^{nd}$-stage SCI), the receiving UE may estimate distance information between the transmitting UE and the receiving UE based on the location information about the transmitting UE. In this case, the receiving UE may estimate several distance values according to the Zone ID value. In this case, the receiving UE may determine the transmit power of a PSFCH based on the smallest value among the plurality of estimated distance values. For example, an offset value for the transmit power of a PSFCH may be predefined for each distance information or distance range. For example, an offset value for the transmit power of a PSFCH may be configured or pre-configured for a UE for each distance information or distance range. Also, for each distance information or distance range, an offset value for transmit power of a PSFCH may be configured or pre-configured for a UE, for each at least one of the number of transmitted PSFCHs, the maximum number of simultaneously transmittable PSFCHs, the type of the UE, the power control mode, the service type, and/or the priority. When the offset value is previously defined, the transmit power of a PSFCH may be increased or decreased in proportion to the distance.

For example, the transmit power of a PSFCH may be determined based on RSRP measured from the corresponding PSCCH, PSCCH DMRS, PSSCH, PSSCH DMRS, CSI-RS, and/or PT-RS. For example, an offset value for the transmit power of a PSFCH may be predefined for each RSRP range. For example, an offset value for the transmit power of a PSFCH may be configured or pre-configured for a UE for each RSRP range. For example, the RSRP may be L1-RSRP. For example, the RSRP may be an L3-RSRP to which a higher filter value is applied. Also, for each of the RSRP range, an offset value for transmit power of a PSFCH may be configured or pre-configured for a UE, for each at least one of the number of transmitted PSFCHs, the maximum number of simultaneously transmittable PSFCHs, the type of the UE, the power control mode, the service type, and/or the priority. When the offset value is previously defined, the transmit power of a PSFCH may be increased or decreased in inverse proportion to the RSRP value.

Figure 14:
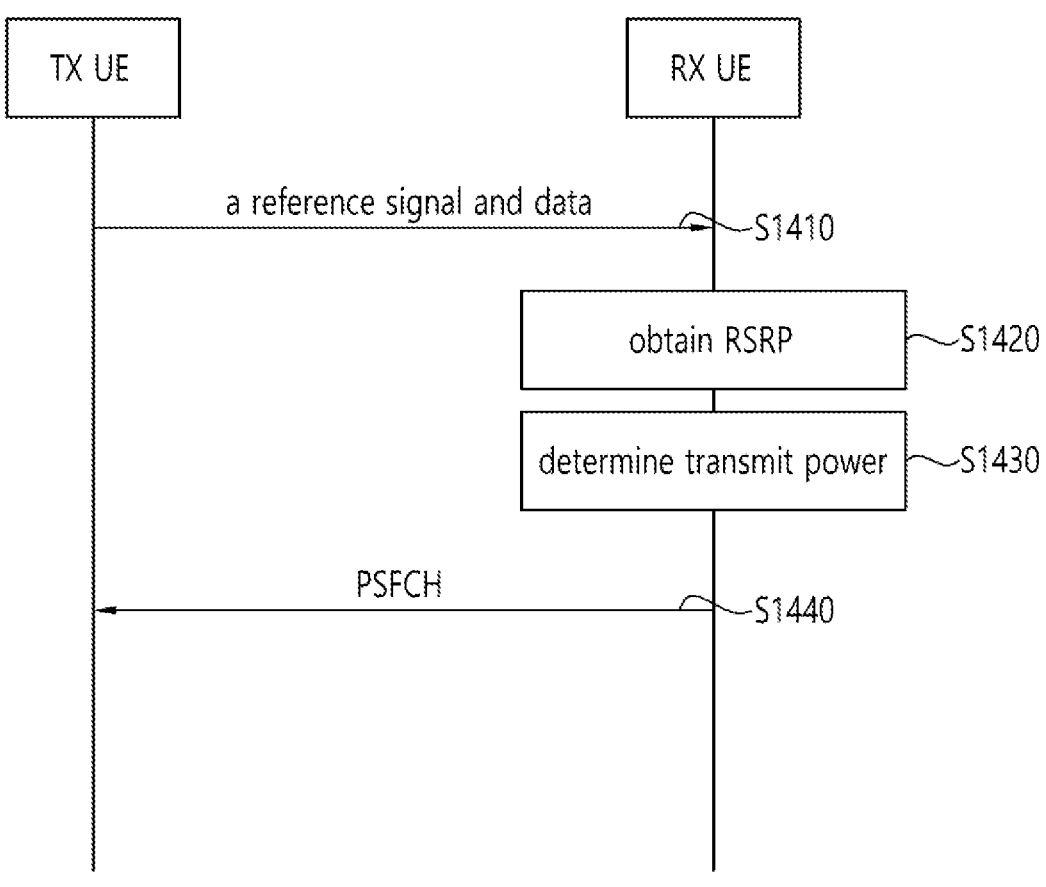
FIG. 14 shows a procedure in which a receiving UE transmits a PSFCH according to an embodiment of the present disclosure.

FIG. 14 shows a procedure in which a receiving UE transmits a PSFCH according to an embodiment of the present disclosure. The embodiment of FIG. 14 may be combined with various embodiments of the present disclosure.

Referring to FIG. 14, in step S1410, a transmitting UE may transmit a reference signal and data to a receiving UE. In step S1420, the receiving UE may obtain RSRP related to the reference signal. In step S1430, the receiving UE may determine the transmit power of a PSFCH related to the data based on the RSRP. For example, the receiving UE may increase or decrease the transmit power of the PSFCH in inverse proportion to the RSRP value. For example, the transmit power of the reference signal may not be considered in determining the transmit power of the PSFCH. In step S1440, the receiving UE may transmit the PSFCH to the transmitting UE based on the transmit power of the PSFCH.

Meanwhile, depending on the power control mode or the type of a UE, only the sidelink transmission mode may be supported and the sidelink reception mode may not be supported. In the above case, it may be impossible for a transmitting UE to receive information such as RSRP from a receiving UE. Therefore, a transmitting UE may not be able to perform power control based on a pathloss between UEs. In addition, since the transmitting UE cannot establish a PC5-RRC connection with a receiving UE, it may be inappropriate for the transmitting UE to perform unicast communication. Accordingly, the transmitting UE may consider operating in broadcast and/or groupcast (e.g., connection-less groupcast). In addition, when the transmitting UE transmits a PSSCH, the transmitting UE may deactivate transmission of a PSFCH corresponding to the PSSCH.

For example, depending on a transmitting UE and/or the power control mode that does not support the sidelink reception mode, the transmitting UE may schedule a PSSCH only with the $1^{st}$-stage SCI without the $2^{nd}$-stage SCI. For example, the transmitting UE may use $1^{st}$-stage SCI to indicate to a receiving UE that the $2^{nd}$-stage SCI is not used. For example, the transmitting UE may indicate to a receiving UE that the $2^{nd}$-stage SCI is not used by using the $2^{nd}$-stage SCI format. For example, the transmitting UE may indicate to a receiving UE that the $2^{nd}$-stage SCI is not used by using a beta offset indicator. Here, for example, the beta offset indicator may be set to zero. For example, the transmitting UE may indicate to a receiving UE that the $2^{nd}$-stage SCI is not used by using a UE type indicator. In the above case, receiving UE(s) may report additional information to a base station, and the base station may determine the transmit power for PSCCH/PSSCH of the transmitting UE based on the additional information through RRC signaling and/or DCI indication. Specifically, for example, the additional information may include quality information on PSCCH/PSSCH received from a transmitting UE that does not support the sidelink reception mode. For example, the quality information may include RSRP, inter-UE distance information, and/or HARQ feedback information or a corresponding statistical value.

Meanwhile, a transmission UE in the power saving mode supporting the sidelink reception mode needs to efficiently determine or manage transmit power for a PSCCH/PSSCH. Basically, a transmitting UE may perform power control based on a pathloss between UEs, and for this, the transmitting UE may operate only in unicast. Alternatively, a UE in the power saving mode may control transmit power for PSCCH/PSSCH and/or PSFCH based on a pathloss between UEs even in the case of groupcast.

On the other hand, in order for a transmitting UE to perform power control based on a pathloss between UEs, the transmitting UE needs to receive RSRP-related information from a receiving UE. In other words, in order for a transmitting UE to receive information related to RSRP from a receiving UE, the transmitting UE needs to transmit a reference signal related to RSRP measurement of a sufficient amount to the receiving UE. However, in the above process and the processing time interval for it, a transmitting UE may use the transmit power inefficiently, there is a need to effectively reduce the time interval. In order to increase the accuracy of an RSRP report by a receiving UE, a transmitting UE needs to transmit a sufficient amount of PSSCH DMRS to the receiving UE. Here, for example, the PSSCH DMRS may mean a DMRS transmitted on a PSSCH. For the above method, for example, a transmitting UE may increase the density of a PSSCH DMRS. Specifically, for example, a transmitting UE may allocate an additional DMRS resource at least during an RSRP measurement period. For example, a transmitting UE may allocate one additional symbol to each DMRS symbol on a PSSCH for DMRS transmission. Through this, a transmitting UE may transmit a DMRS using two symbols for each DMRS symbol position. For example, two symbols used for each DMRS symbol position may be two consecutive symbols. The above method is only an embodiment, and even when the number of additional symbols and a mapping method are different, the technical spirit of the present disclosure can be extended. For example, a transmitting UE may increase transmit power or Power Spectral Density (PSD) for all or part of a PSSCH DMRS. For example, a transmitting UE may indicate the above operation using SCI (e.g., $1^{st}$-stage SCI and/or $2^{nd}$-stage SCI). For example, a filter value for L3-RSRP measurement and/or reporting may be differently configured or pre-configured for a UE according to the type of the UE. For example, a filter value for L3-RSRP measurement and/or reporting may be configured or pre-configured differently for each UE for each power saving mode.

For example, depending on the type of a UE, a transmitting UE may perform power ramping on the transmit power of a PSCCH/PSSCH. For example, according to the power control mode, a transmitting UE may perform power ramping on the transmit power of a PSCCH/PSSCH. For example, depending on the service type, a transmitting UE may perform power ramping on the transmit power of a PSCCH/PSSCH. For example, according to the priority, a transmitting UE may perform power ramping on the transmit power of a PSCCH/PSSCH. For example, when a transmitting UE determines/judging that the HARQ feedback for a PSSCH is ACK, the transmitting UE may maintain and/or reduce the transmit power for the subsequent PSCCH/PSSCH. For example, when a transmitting UE judges/determines that a HARQ feedback for a PSSCH is NACK, the transmitting UE may maintain and/or increase transmit power for a subsequent PSCCH/PSSCH. For example, when a transmitting UE receives a NACK through a PSFCH and/or when the transmitting UE fails to detect the PSFCH in unicast/groupcast HARQ feedback option 2, the transmitting UE may maintain and/or increase transmit power for a subsequent PSCCH/PSSCH. For example, according to a CSI report value (e.g., RI and/or CQI value) interval for a PSSCH, a transmitting UE may increase the transmit power for the PSSCH in transmission after receiving the CSI report. For example, according to a CSI report value interval for a PSSCH, a transmitting UE may decrease the transmit power for the PSSCH in transmission after receiving the CSI report. For example, according to a CSI report value interval for a PSSCH, a transmitting UE may maintain the transmit power for the PSSCH in transmission after receiving the CSI report. Specifically, for example, a transmitting UE may reset power ramping every TB or after a specific time. For example, after PSCCH/PSSCH is transmitted, and if there is no additional PSCCH/PSSCH transmission during a predefined time or (pre)configured time interval, a transmitting UE may reset power ramping. For example, the unit or size of power ramping may be configured or pre-configured for a UE according to the type of a UE. For example, the unit or size of power ramping may be configured or pre-configured for a UE according to the power control mode. For example, the unit or size of power ramping may be configured or pre-configured for a UE according to the service type. For example, the unit or size of power ramping may be configured or pre-configured for a UE according to priority.

Operations according to various embodiments of the present disclosure may be performed independently, or a combination of all or a part may be performed together.

FIG. 15 shows a method for a first device to perform wireless communication, according to an embodiment of the present disclosure. The embodiment of FIG. 15 may be combined with various embodiments of the present disclosure.

Referring to FIG. 15, in step S1510, a first device may receive first sidelink control information (SCI) from a second device through a physical sidelink control channel (PSCCH). In step S1520, the first device may receive a reference signal and data from the second device through a physical sidelink shared channel (PSSCH) related to the PSCCH. In step S1530, the first device may determine a physical sidelink feedback channel (PSFCH) resource, based on a subchannel and a slot related to the PSSCH. In step S1540, the first device may measure reference signal received power (RSRP) based on the reference signal received through the PSSCH related to the PSFCH resource. In step S1550, the first device may determine first transmit power of a PSFCH transmitted on the PSFCH resource, based on the RSRP. In step S1560, the first device may transmit the PSFCH to the second device based on the determined first transmit power of the PSFCH.

For example, determining the first transmit power of the PSFCH may include: determining an offset value related to the first transmit power of the PSFCH. For example, the offset value may be determined based on a range of the RSRP.

For example, the offset value may be determined to be inversely proportional to the RSRP.

For example, the first transmit power may be determined based on first maximum transmit power of the first device.

For example, second maximum transmit power related to the PSFCH may be a value obtained by multiplying the first maximum transmit power by a scaling value.

For example, the scaling value may be configured based on a resource pool related to the PSFCH.

For example, the scaling value may be configured based on a type of the first device.

For example, the scaling value may be configured based on a power saving mode of the first device.

For example, second maximum transmit power related to the PSFCH may be a value obtained by multiplying a value obtained by dividing the first maximum transmit power by a maximum number of simultaneous transmissions of the PSFCH by a scaling value.

For example, an unit of the first maximum transmit power may be dB.

For example, second SCI may be expected not to be used, based on the first SCI.

For example, the RSRP may be measured during an RSRP measurement interval, and the reference signal may be received based on two consecutive symbols in the RSRP measurement interval.

For example, second transmit power related to the PSCCH or the PSSCH may be determined based on power ramping.

The above-described embodiment may be applied to various devices to be described below. For example, a processor 102 of a first device 100 may control a transceiver 106 to receive first sidelink control information (SCI) from a second device 200 through a physical sidelink control channel (PSCCH). In step S1520, the processor 102 of the first device 100 may control the transceiver 106 to receive a reference signal and data from the second device 200 through a physical sidelink shared channel (PSSCH) related to the PSCCH. In step S1530, the processor 102 of the first device 100 may determine a physical sidelink feedback channel (PSFCH) resource, based on a subchannel and a slot related to the PSSCH. In step S1540, the processor 102 of the first device 100 may measure reference signal received power (RSRP) based on the reference signal received through the PSSCH related to the PSFCH resource. In step S1550, the processor 102 of the first device 100 may determine first transmit power of a PSFCH transmitted on the PSFCH resource, based on the RSRP. In step S1560, the processor 102 of the first device 100 may control the transceiver 106 to transmit the PSFCH to the second device 200 based on the determined first transmit power of the PSFCH.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive first sidelink control information (SCI) from a second device through a physical sidelink control channel (PSCCH); receive a reference signal and data from the second device through a physical sidelink shared channel (PSSCH) related to the PSCCH; determine a physical sidelink feedback channel (PSFCH) resource, based on a subchannel and a slot related to the PSSCH; measure reference signal received power (RSRP) based on the reference signal received through the PSSCH related to the PSFCH resource; determine first transmit power of a PSFCH transmitted on the PSFCH resource, based on the RSRP; and transmit the PSFCH to the second device based on the determined first transmit power of the PSFCH.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive first sidelink control information (SCI) from a second UE through a physical sidelink control channel (PSCCH); receive a reference signal and data from the second UE through a physical sidelink shared channel (PSSCH) related to the PSCCH; determine a physical sidelink feedback channel (PSFCH) resource, based on a subchannel and a slot related to the PSSCH; measure reference signal received power (RSRP) based on the reference signal received through the PSSCH related to the PSFCH resource; determine first transmit power of a PSFCH transmitted on the PSFCH resource, based on the RSRP; and transmit the PSFCH to the second UE based on the determined first transmit power of the PSFCH.

According to an embodiment of the present disclosure, a non-transitory computer-readable storage medium storing instructions may be proposed. For example, the instructions, when executed, may cause a first device to: receive first sidelink control information (SCI) from a second device through a physical sidelink control channel (PSCCH); receive a reference signal and data from the second device through a physical sidelink shared channel (PSSCH) related to the PSCCH; determine a physical sidelink feedback channel (PSFCH) resource, based on a subchannel and a slot related to the PSSCH; measure reference signal received power (RSRP) based on the reference signal received through the PSSCH related to the PSFCH resource; determine first transmit power of a PSFCH transmitted on the PSFCH resource, based on the RSRP; and transmit the PSFCH to the second device based on the determined first transmit power of the PSFCH.

Figure 16:
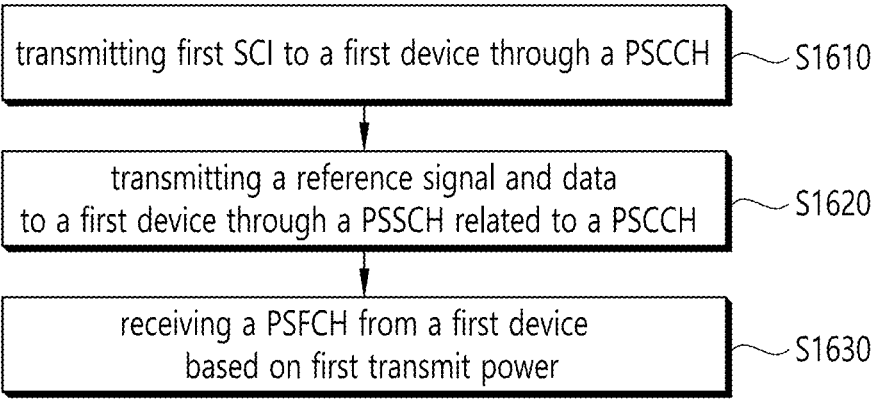
FIG. 16 shows a method for a second device to perform wireless communication, according to an embodiment of the present disclosure.

FIG. 16 shows a method for a second device to perform wireless communication, according to an embodiment of the present disclosure. The embodiment of FIG. 16 may be combined with various embodiments of the present disclosure.

Referring to FIG. 16, in step S1610, a second device may transmit first sidelink control information (SCI) to a first device through a physical sidelink control channel (PSCCH). In step S1620, the second device may transmit a reference signal and data to the first device through a physical sidelink shared channel (PSSCH) related to the PSCCH. In step S1630, the second device may receive a physical sidelink feedback channel (PSFCH) from the first device based on first transmit power. For example, a PSFCH resource related to the PSFCH may be determined based on a subchannel and a slot related to the PSSCH, the first transmit power of the PSFCH transmitted on the PSFCH resource may be determined based on reference signal received power (RSRP), and the RSRP may be measured based on the reference signal received through the PSSCH related to the PSFCH resource.

For example, the first transmit power of the PSFCH may be determined based on an offset value related to the first transmit power, the offset value may be determined based on a range of the RSRP, and the offset value may be determined to be inversely proportional to the RSRP.

The above-described embodiment may be applied to various devices to be described below. For example, a processor 202 of a second device 200 may control a transceiver 206 to transmit first sidelink control information (SCI) to a first device 100 through a physical sidelink control channel (PSCCH). In step S1620, the processor 202 of the second device 200 may control the transceiver 206 to transmit a reference signal and data to the first device 100 through a physical sidelink shared channel (PSSCH) related to the PSCCH. In step S1630, the processor 202 of the second device 200 may control the transceiver 206 to receive a physical sidelink feedback channel (PSFCH) from the first device 100 based on first transmit power. For example, a PSFCH resource related to the PSFCH may be determined based on a subchannel and a slot related to the PSSCH, the first transmit power of the PSFCH transmitted on the PSFCH resource may be determined based on reference signal received power (RSRP), and the RSRP may be measured based on the reference signal received through the PSSCH related to the PSFCH resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: transmit first sidelink control information (SCI) to a first device through a physical sidelink control channel (PSCCH); transmit a reference signal and data to the first device through a physical sidelink shared channel (PSSCH) related to the PSCCH; receive a physical sidelink feedback channel (PSFCH) from the first device based on first transmit power, wherein a PSFCH resource related to the PSFCH may be determined based on a subchannel and a slot related to the PSSCH, wherein the first transmit power of the PSFCH transmitted on the PSFCH resource may be determined based on reference signal received power (RSRP), and wherein the RSRP may be measured based on the reference signal received through the PSSCH related to the PSFCH resource.

For example, the first transmit power of the PSFCH may be determined based on an offset value related to the first transmit power, the offset value may be determined based on a range of the RSRP, and the offset value may be determined to be inversely proportional to the RSRP.

Hereinafter, a device to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
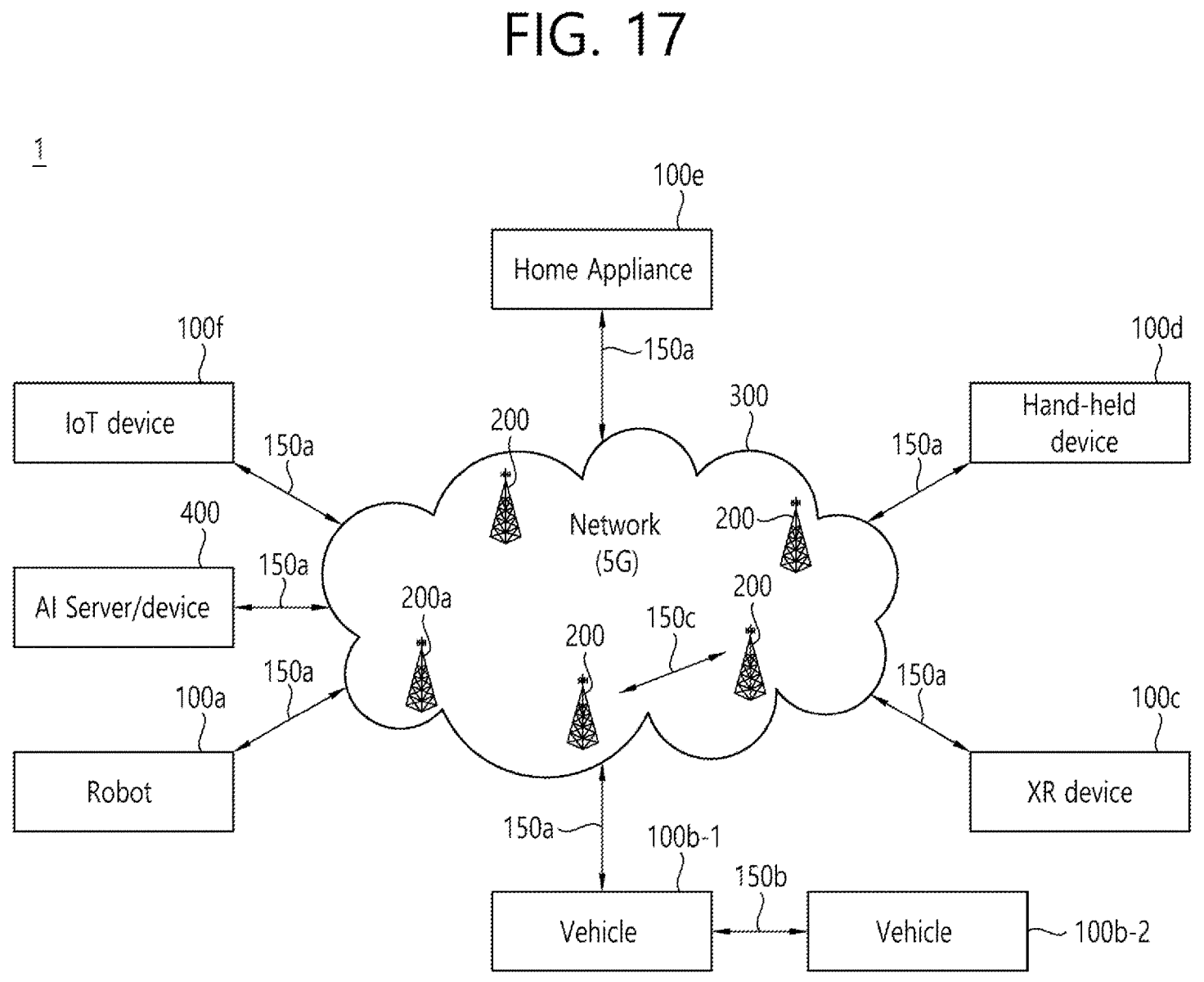

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
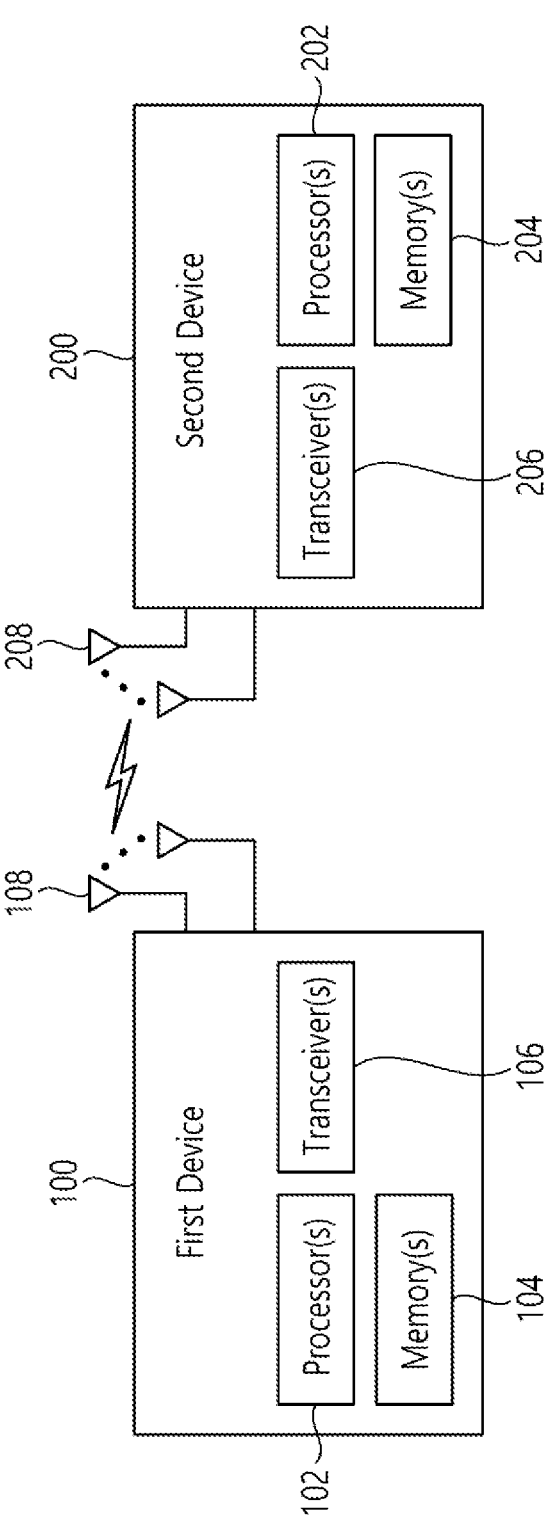
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
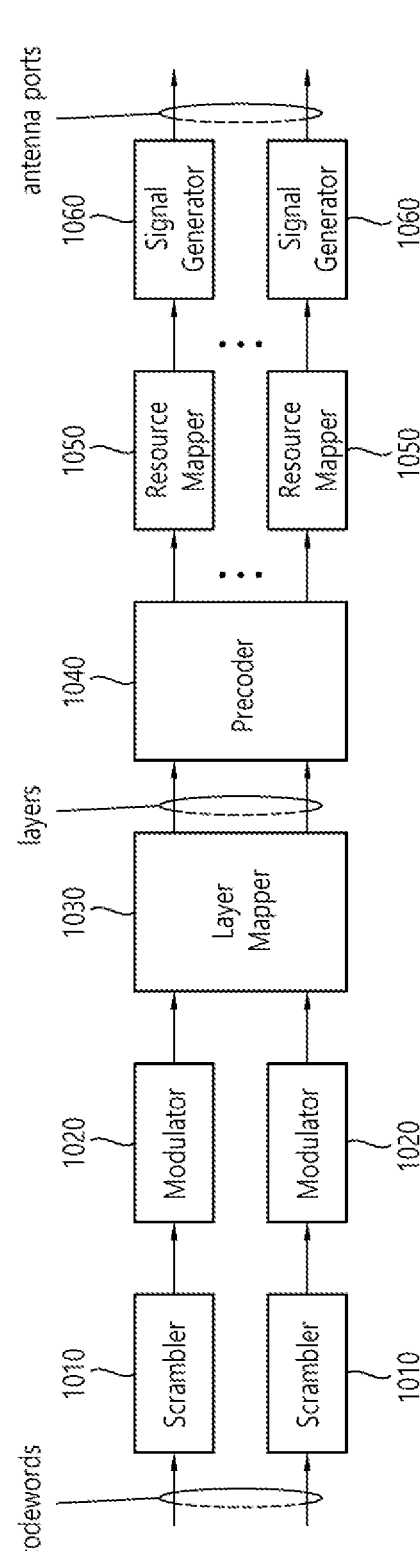
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
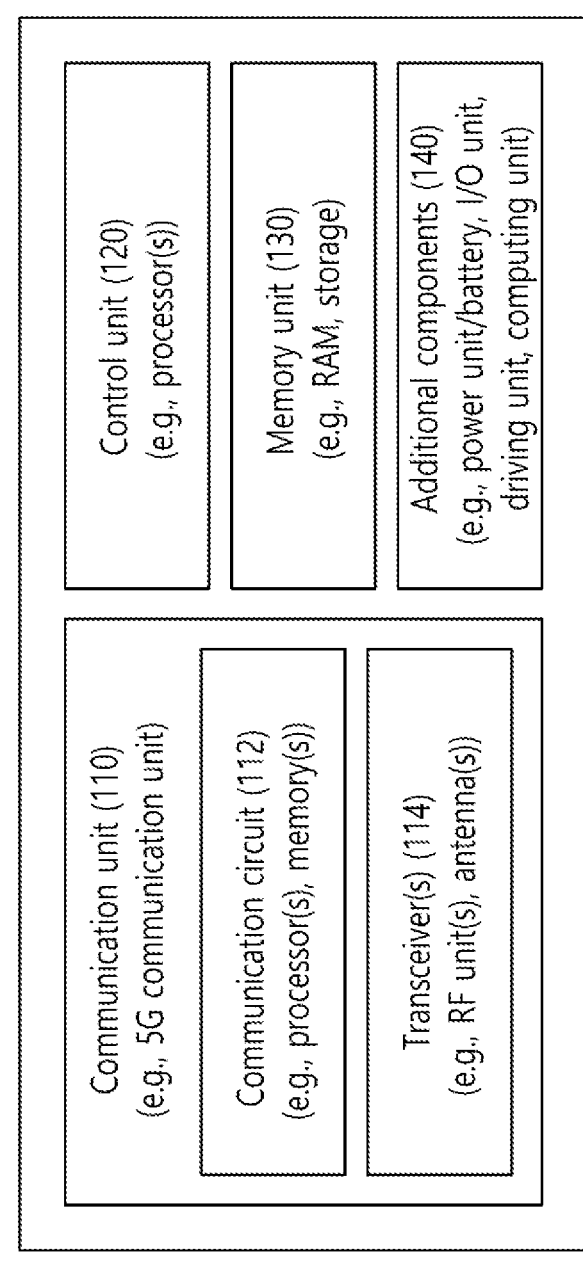
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
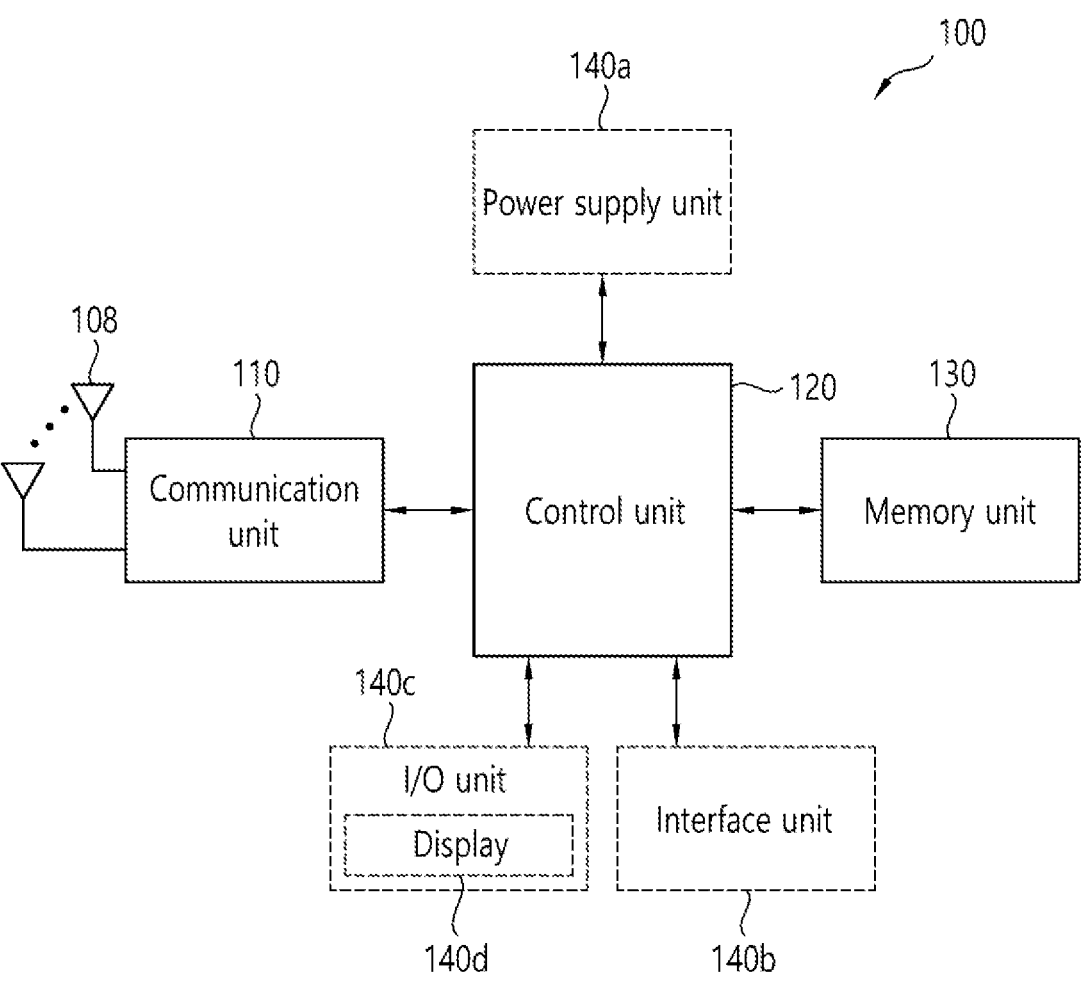
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in a device, and technical features in device claims can be combined to be implemented or performed in a method. Further, technical features in method claim(s) and device claim(s) can be combined to be implemented or performed in a device. Further, technical features in method claim(s) and device claim(s) can be combined to be implemented or performed in a method.

What is claimed is:

1. A method comprising:

receiving first sidelink control information (SCI) from a second device through a physical sidelink control channel (PSCCH);

receiving data, through a physical sidelink shared channel (PSSCH) related to the PSCCH, and a reference signal associated with the PSSCH;

determining a physical sidelink feedback channel (PSFCH) resource, based on a subchannel and a slot related to the PSSCH;

measuring reference signal received power (RSRP) based on the reference signal associated with the PSSCH;

determining first transmit power of a PSFCH transmitted on the PSFCH resource, based on the RSRP and second maximum transmit power related to the PSFCH, wherein the second maximum transmit power is a value obtained by multiplying first maximum transmit power of a first device by a scaling value configured based on a resource pool related to the PSFCH; and transmitting the PSFCH to the second device based on the determined first transmit power of the PSFCH.

2. The method of claim 1, wherein determining the first transmit power of the PSFCH includes:

determining an offset value related to the first transmit power of the PSFCH, wherein the offset value is determined based on a range of the RSRP.

3. The method of claim 2, wherein the offset value is determined to be inversely proportional to the RSRP.

4. The method of claim 1, wherein a unit of the first maximum transmit power is dB.

5. The method of claim 1, wherein second SCI is expected not to be used, based on the first SCI.

6. The method of claim 1, wherein the RSRP is measured during an RSRP measurement interval, and wherein the reference signal is received based on two consecutive symbols in the RSRP measurement interval.

7. The method of claim 1, wherein second transmit power related to the PSCCH or the PSSCH is determined based on power ramping.

8. A first device comprising:

one or more processors;

one or more transceivers; and one or more memories connected to the one or more processors and storing instructions, wherein the instructions, based on being executed by the one or more processors, cause the first device to:

receive first sidelink control information (SCI) from a second device through a physical sidelink control channel (PSCCH);

receive data, through a physical sidelink shared channel (PSSCH) related to the PSCCH, and a reference signal associated with the PSSCH;

determine a physical sidelink feedback channel (PSFCH) resource, based on a subchannel and a slot related to the PSSCH;

measure reference signal received power (RSRP) based on the reference signal associated with the PSSCH;

determine first transmit power of a PSFCH transmitted on the PSFCH resource, based on the RSRP and second maximum transmit power related to the PSFCH, wherein the second maximum transmit power is a value obtained by multiplying first maximum transmit power of the first device by a scaling value configured based on a resource pool related to the PSFCH; and transmit the PSFCH to the second device based on the determined first transmit power of the PSFCH.

9. A processing device adapted to control a first device, the processing device comprising:

one or more processors; and one or more memories connected to the one or more processors and storing instructions, wherein the instructions, based on being executed by the one or more processors, cause the first device to:

receive first sidelink control information (SCI) from a second UE through a physical sidelink control channel (PSCCH);

receive data, through a physical sidelink shared channel (PSSCH) related to the PSCCH, and a reference signal associated with the PSSCH;

determine a physical sidelink feedback channel (PSFCH) resource, based on a subchannel and a slot related to the PSSCH;

measure reference signal received power (RSRP) based on the reference signal associated with the PSSCH;

determine first transmit power of a PSFCH transmitted on the PSFCH resource, based on the RSRP and second maximum transmit power related to the PSFCH, wherein the second maximum transmit power is a value obtained by multiplying first maximum transmit power of the first device by a scaling value configured based on a resource pool related to the PSFCH; and transmit the PSFCH to the second UE based on the determined first transmit power of the PSFCH.

* * * * *